US012621409B2

(12) United States Patent
Sharifi

(10) Patent No.: US 12,621,409 B2
(45) Date of Patent: May 5, 2026

(54) MULTI-PARTY OPTIMIZATION FOR AUDIOVISUAL ENHANCEMENT

(71) Applicant: Google LLC, Mountain View, CA (US)

(72) Inventor: Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 389 days.

(21) Appl. No.: 18/255,399

(22) PCT Filed: Mar. 3, 2021

(86) PCT No.: PCT/US2021/020632
§ 371 (c)(1),
(2) Date: Jun. 1, 2023

(87) PCT Pub. No.: WO2022/186827
PCT Pub. Date: Sep. 9, 2022

(65) Prior Publication Data
US 2024/0040080 A1      Feb. 1, 2024

(51) Int. Cl.
*H04N 7/14*        (2006.01)
*G06F 3/01*        (2006.01)
*H04N 7/15*        (2006.01)
(52) U.S. Cl.
CPC ............. *H04N 7/147* (2013.01); *G06F 3/011* (2013.01); *H04N 7/15* (2013.01)
(58) Field of Classification Search
CPC .......... H04N 7/147; H04N 7/15; G06F 3/011
See application file for complete search history.

(56) References Cited

U.S. PATENT DOCUMENTS

| 10,382,722 B1 | 8/2019 | Peters et al. | |
| 2013/0028443 A1* | 1/2013 | Pance | ................ H04N 21/4223 |
| | | | 381/107 |

(Continued)

FOREIGN PATENT DOCUMENTS

EP          3174287          5/2017

OTHER PUBLICATIONS

Ephrat et al., "Looking to Listen at the Cocktail Party: A Speaker-Independent Audio-Visual Model for Speech Separation.", arXiv:1804.03619v2, Aug. 9, 2018, 11 pages.

(Continued)

*Primary Examiner* — Amal S Zenati
(74) *Attorney, Agent, or Firm* — DORITY & MANNING, P.A.

(57) ABSTRACT
A computer-implemented method for selectively applying audiovisual enhancement functions to an audiovisual communications stream includes transmitting, by a sender computing system, an audiovisual communication stream to a receiver computing system, obtaining, by the sender computing system, one or more receiver perception feedback signals associated with the audiovisual communication stream, the one or more receiver perception feedback signals obtained as output from one or more receiver perception feedback models at the receiver computing system and descriptive of perception of the audiovisual communication stream by a user operating the receiver computing system, and applying, by the sender computing system, one or more audiovisual enhancement functions to the audiovisual communication stream based at least in part on the one or more receiver perception feedback signals.

21 Claims, 5 Drawing Sheets

(56)                    References Cited

U.S. PATENT DOCUMENTS

| | | | |
|---|---|---|---|
| 2013/0132521 A1* | 5/2013 | Fonseca, Jr. | H04N 21/47202 |
| | | | 709/219 |
| 2016/0014476 A1 | 1/2016 | Caliendo, Jr. | |
| 2016/0277244 A1* | 9/2016 | Reichert, Jr. | H04N 21/4223 |
| 2017/0293356 A1 | 10/2017 | Khaderi et al. | |
| 2019/0320114 A1* | 10/2019 | Lee | H04N 5/60 |

OTHER PUBLICATIONS

Gergshorn, "Google is Using AI to Compress Photos, just like on HBO's Silicon Valley.", Aug. 23, 2016, https://qz.com/763649/google-is-working-on-a-way-for-ai-to-compress-your-photos-just-like-on-hbos-silicon-valley, retrieved on Sep. 29, 2023, 5 pages.
International Preliminary Report on Patentability for PCT/US2021/020632, mailed on Sep. 14, 2023, 12 pages.
NVIDIA.com, "NVIDIA Maxine.", 2023, https://developer.nvidia.com/maxine, retrieved on Sep. 29, 2023, 5 pages.
QZ.com, "Google is Using AI to Compress Photos, Just Like on HBO's Silicon Valley.", Aug. 23, 2016, https://qz.com/763649/google-is-working-on-a-way-for-ai-to-compress-your-photos-just-like-on-hbos-silicon-valley, retrieved on Sep. 7, 2023, 5 pages.
Tagliasacchi et al., "SEANet: A Multi-modal Speech Enhancement Network.", arXiv:2009.02095v2, Oct. 1, 2020, 5 pages.
International Search Report for Application No. PCT/US2021/020632, mailed on Jan. 24, 2022, 5 pages.

* cited by examiner

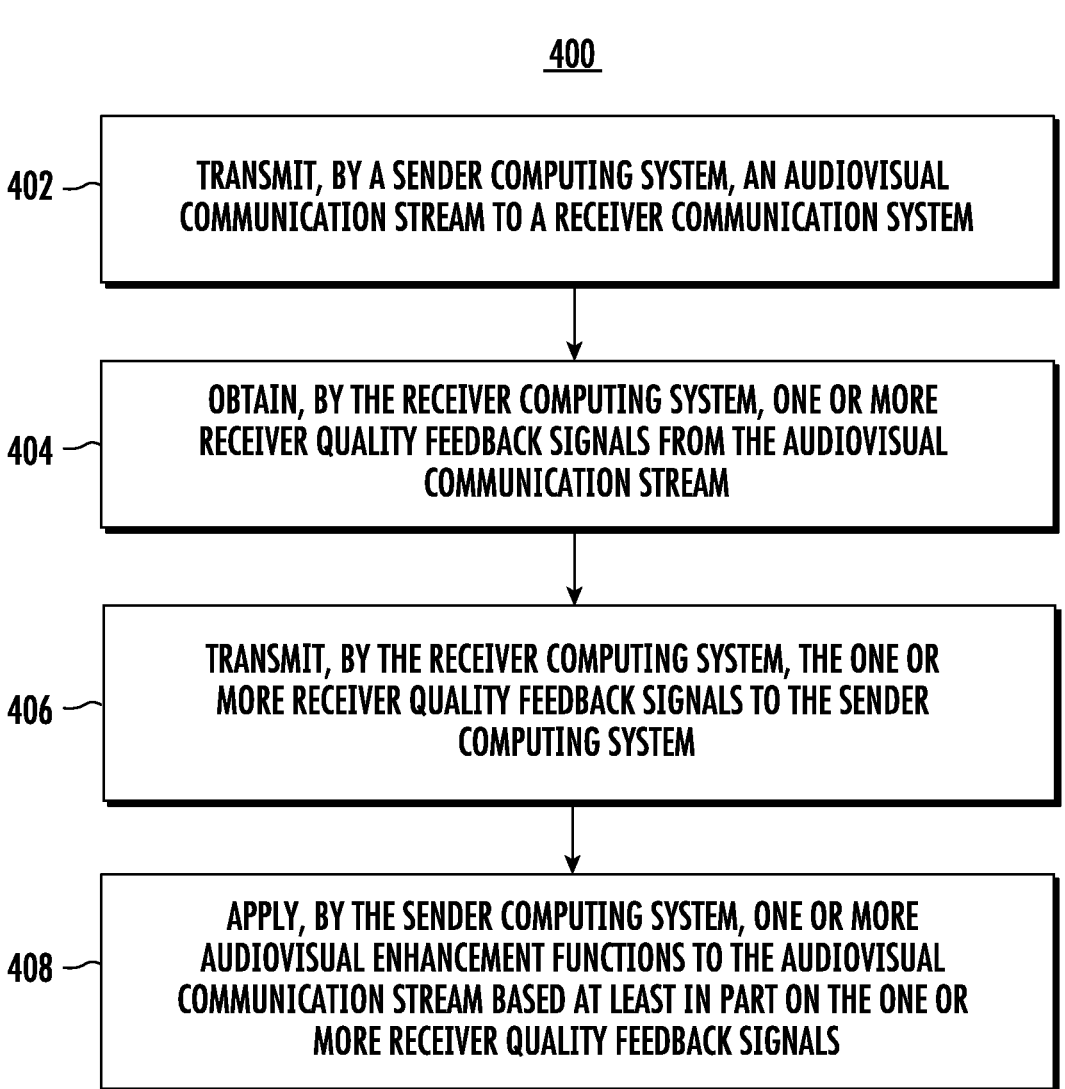

400

402 — TRANSMIT, BY A SENDER COMPUTING SYSTEM, AN AUDIOVISUAL COMMUNICATION STREAM TO A RECEIVER COMMUNICATION SYSTEM

404 — OBTAIN, BY THE RECEIVER COMPUTING SYSTEM, ONE OR MORE RECEIVER QUALITY FEEDBACK SIGNALS FROM THE AUDIOVISUAL COMMUNICATION STREAM

406 — TRANSMIT, BY THE RECEIVER COMPUTING SYSTEM, THE ONE OR MORE RECEIVER QUALITY FEEDBACK SIGNALS TO THE SENDER COMPUTING SYSTEM

408 — APPLY, BY THE SENDER COMPUTING SYSTEM, ONE OR MORE AUDIOVISUAL ENHANCEMENT FUNCTIONS TO THE AUDIOVISUAL COMMUNICATION STREAM BASED AT LEAST IN PART ON THE ONE OR MORE RECEIVER QUALITY FEEDBACK SIGNALS

FIG. 4

MULTI-PARTY OPTIMIZATION FOR AUDIOVISUAL ENHANCEMENT

PRIORITY CLAIM

The present application is based upon and claims the right of priority under 35 U.S.C. § 371 to International Application No. PCT/US2021/020632 filed on Mar. 3, 2021, which is incorporated by reference herein.

FIELD

The present disclosure relates generally to multi-party optimization for audiovisual enhancement. More particularly, the present disclosure relates to systems and methods for selectively applying audiovisual enhancement functions to an audiovisual communications stream based at least in part on one or more receiver feedback signals from one or more receiver feedback models.

BACKGROUND

Audiovisual communications refers to a manner of communication by transmission of audio and/or video content from a sender to a receiver. For instance, audiovisual data can be captured or otherwise obtained at a sender and transmitted by the internet to a receiver. Digital audiovisual communication (e.g., video conferencing) has become increasingly common for business and/or social use. Multiple parties can participate in audiovisual communication, with each party being capable of transmitting and/or receiving audiovisual data to and/or from other parties.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for selectively applying audiovisual enhancement functions to an audiovisual communications stream. The computer-implemented method includes transmitting, by a sender computing system, an audiovisual communication stream to a receiver computing system. The computer-implemented method includes obtaining, by the sender computing system, one or more receiver perception feedback signals associated with the audiovisual communication stream, the one or more receiver perception feedback signals obtained as output from one or more receiver perception feedback models at the receiver computing system and descriptive of perception of the audiovisual communication stream by a user operating the receiver computing system. The computer-implemented method includes applying, by the sender computing system, one or more audiovisual enhancement functions to the audiovisual communication stream based at least in part on the one or more receiver perception feedback signals.

Another example aspect of the present disclosure is directed to a computing system configured for selectively applying audiovisual enhancement functions to an audiovisual communications stream. The computing system includes a sender computing system including one or more processors and one or more memory devices storing computer readable instructions that, when implemented, cause the one or more processors to perform operations. The operations include transmitting an audiovisual communication stream to a receiver computing system. The operations include receiving, from the receiver computing system, one or more receiver perception feedback signals. The operations include applying one or more audiovisual enhancement functions to the audiovisual communication stream based at least in part on the one or more receiver perception feedback signals.

Another example aspect of the present disclosure is directed to a computing system configured for selectively applying audiovisual enhancement functions to an audiovisual communications stream. The computing system includes a receiver computing system including one or more processors and one or more memory devices storing computer readable instructions that, when implemented, cause the one or more processors to perform operations. The operations include receiving, from a sender computing system, an audiovisual communication stream. The operations include obtaining one or more receiver perception feedback signals associated with the audiovisual communication stream, the one or more receiver perception feedback signals obtained as output from one or more receiver perception feedback models. The operations include transmitting the one or more receiver perception feedback signals to the sender computing system.

Another example aspect of the present disclosure is directed to a computer-implemented method for selectively applying audiovisual enhancement functions in a multiparty communication. The computer-implemented method includes receiving, by a receiver computing system, at least one audiovisual communication stream including a plurality of audiovisual communication channels from a plurality of sender computing systems. The computer-implemented method includes obtaining, by the receiver computing system, a plurality of receiver perception feedback signals respectively associated with each of the plurality of audiovisual communication channels, the one or more receiver perception feedback signals obtained as output from one or more receiver perception feedback models at the receiver computing system and descriptive of perception of a respective audiovisual communication channel by a user operating the receiver computing system. The computer-implemented method includes transmitting, by the receiver computing system, the plurality of receiver perception feedback signals to a respective sender computing system of the plurality of sender computing systems.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts a flow chart diagram of an example method to perform audiovisual communications according to example embodiments of the present disclosure.

Figure 1A:
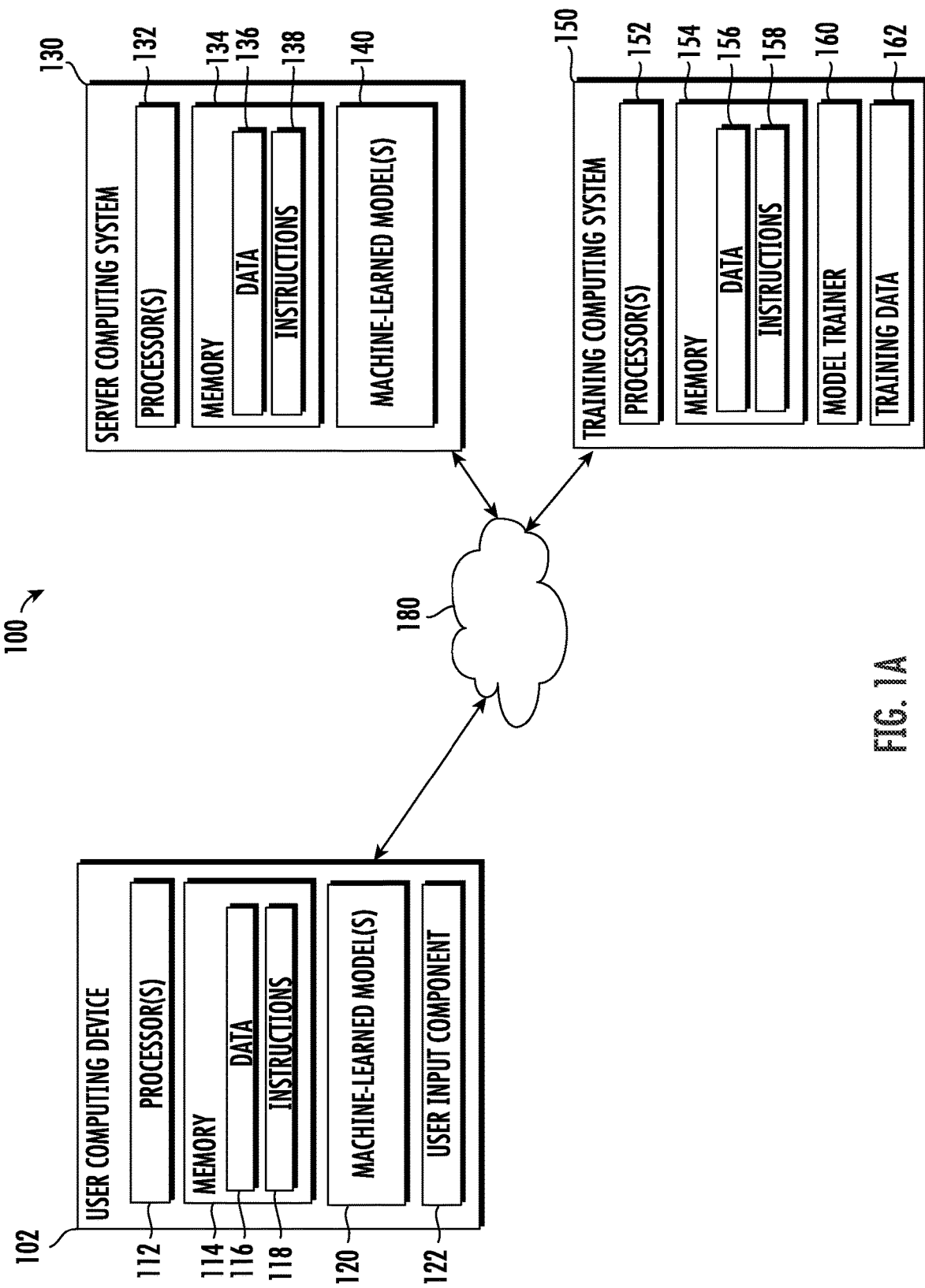
FIG. 1A depicts a block diagram of an example computing system that performs audiovisual communications according to example embodiments of the present disclosure.

Reference numerals that are repeated across plural figures are intended to identify the same features in various implementations.

DETAILED DESCRIPTION

Generally, the present disclosure is directed to audiovisual enhancements in multi-party audiovisual communication. Audiovisual communication (e.g., digital audiovisual communication), such as videoconferencing, has become increasingly popular in recent years as a tool for personal and/or professional connectedness. As used herein, audiovisual communication refers to communications performed by transmission of audiovisual data over a network (e.g., through a central server or other computing node, in a peer to peer network, etc.). For instance, audiovisual communication can include video conferencing, video streaming, broadcasting, or other suitable forms of audiovisual communication between a sender, responsible for generating or otherwise obtaining audiovisual content. In some implementations, the audiovisual communication may be multidirectional audiovisual communication such that some or all parties in a conference can (e.g., simultaneously) act as both sender and receiver.

Audiovisual communications can desirably provide high fidelity and/or low-latency communications, but are frequently constrained by available computing resources, such as network bandwidth (machine-learned and/or of each participant), metered connections, participant hardware quality (e.g., camera quality, microphone quality, signal processing capacity, etc.), environmental factors, and/or other factors. Fidelity of the communications can be reduced from source-level fidelity to manage these constraints, resulting in a tradeoff between fidelity and computing resources. Decreasing fidelity too greatly can result in the communications becoming unintelligible. Attempting to transmit with too high of a fidelity, contributing to usage of too much bandwidth, processing, or other computational resource(s), can result in undesirable latency, dropped packets, or other quality issues. It is generally desirable to manage parameters of the audiovisual communications, such as audio/video resolution, etc., to provide intelligible communications without excessive use of available resources (e.g., bandwidth), such as more than is necessary.

Some existing approaches, such as neural network based compression and enhancement, promise to improve audiovisual communications. However, some typical compression and/or enhancement techniques optimize for a single criteria, such as bandwidth, with a fixed notion of perceptual quality. Furthermore, some existing systems apply these techniques in a static way, where the techniques are applied by a sender and inverted by a receiver as necessary. For instance, the techniques are generally selected by the sender. The dynamic nature of communications, such as changing environmental factors, bandwidth, etc., results in these sender-selected techniques being suboptimal in some cases.

In contrast to these approaches, systems and methods according to example aspects of the present disclosure seek to improve audiovisual communications by applying audiovisual enhancement functions selectively and while considering feedback signals available at a receiver. Example aspects of the present disclosure recognize that perceptual quality is not fixed, but rather can vary even for consistent technical qualities (e.g., bandwidth usage) based on a receiver's environment, hardware, or hearing capabilities, among other factors. For instance, according to example aspects of the present disclosure, senders and receivers can work together to provide improved management of computing resources (e.g., bandwidth) and quality, in particular understandability, of the audiovisual communication. Receiver feedback signals can be continually determined at the receiver and/or fed back to the sender such that the sender can selectively apply audiovisual enhancements, such as audio and/or video compression, resolution changes, filtering, etc., responsive to the feedback signal, thereby providing an improved understandability of the audiovisual communications.

For instance, various systems and methods according to example aspects of the present disclosure can, based on receiver feedback signals, jointly optimize, in real-time, resource usage (e.g., bandwidth usage required to transmit the audiovisual stream) and the perceptual quality of the received audiovisual communication stream (which may change over time in dependence on a number of factors, such as signal communication quality, network changes, etc.). The feedback signals can be descriptive of perception characteristics (e.g., quality, focus, etc.) of the receiver in audiovisual communications. This can provide for controlled bandwidth usage, among usage of other computing resources, while also improving interpretability or understandability at the receiver-side. Furthermore, in some implementations, this can provide the receiver with the capability of focusing (e.g., with gaze detection or other focusing filters) on specific objects, sounds, or other portions of communications on the sender's side, allowing those focused portions to be selected for higher-fidelity inclusion in communications than lower-fidelity non-focused portions, thereby more efficiently utilizing finite computing resources.

As used herein, understandability denotes a relative degree to which a recipient of the audiovisual communications is able to comprehend information intended to be transmitted by the audiovisual communications. For example, understandability can directly relate to audio fidelity and/or video fidelity. Additionally and/or alternatively, understandability can relate to particular aspects of interest within the larger audiovisual data, such as, for example, a region of video data depicting a presented object, audio data conveying spoken word, a particular region of video upon which a receiver is focusing, and/or other suitable aspects of interest. For instance, in some implementations, at least some of the receiver feedback signals can be indicative of understandability.

Systems and methods according to example aspects of the present disclosure can provide for selectively applying audiovisual enhancement functions to an audiovisual communications stream. The audiovisual enhancement functions can be selectively applied to improve understandability for participants of the audiovisual communications stream. The audiovisual communications stream can be unidirectional (e.g., having a sending computing system and a receiving computing system) and/or bidirectional (e.g., in which some or all computing systems can act as a sender and receiver, such as simultaneously).

Systems and methods according to example aspects of the present disclosure can provide for transmitting, by a sender computing system, an audiovisual communication stream to a receiver computing system. The audiovisual communication stream can be any suitable representation of audiovisual communications. For instance, the audiovisual communication stream may be a real-time stream, such as a stream including a plurality of frames, packets, etc. Additionally and/or alternatively, the audiovisual communication stream may be pre-recorded, such as a pre-recorded video provided from a video streaming service. The audiovisual communication stream may be continuous and/or synchronous (e.g., provided in real time or near-real time). Example aspects of the present disclosure are generally discussed with reference to a multi-party, bidirectional audiovisual communication, such as a teleconference, video call, etc. It should be understood that example aspects of the present disclosure can be applied to any suitable audiovisual stream, including unidirectional communications, media streaming services, user-generated content streaming services, broadcasting services, surveillance systems, (e.g., audiovisual) sensors performing data upload, or other suitable streams.

For instance, an audio-based and/or video-based conference, call, or other form of audiovisual communication (e.g., the audiovisual stream) can be established between two or more parties, including a sender computing system and a receiver computing system. The audiovisual stream can be established by any suitable communication protocol, such as TCP or UDP. The audiovisual stream may also be established by any suitable communication or other streaming application.

The sender computing system can, in some implementations, initially run one or more audiovisual enhancement functions, such as compression models or algorithms. The compression models or algorithms can be any suitable compression models/algorithms, such as neural network based compression models (e.g., encoder/decoder-based models, generative models, etc.), heuristic-based compression models/algorithms, or any other suitable compression models/algorithms. Generally, these compression models/algorithms can receive an audio and/or video frame or sequence of frames as inputs and output a compressed version, such as a compressed version having reduced fidelity and/or reduced storage resource requirements. The audiovisual communication stream can be compressed by any suitable compression algorithm at the sender computing system. The compression algorithm can be rule-based or heuristic-based and/or neural-network- or other machine-learning-based. Example compression algorithms can include MPEG, AAC, or Vorbis, among others. The compressed stream can be decompressed at the receiver side by a corresponding decompression algorithm.

Additionally, the audiovisual enhancement functions can include models or other functions for enhancements such as filtering ambient/background noise from audio data, filtering background objects from video data (e.g., blurring a background), upscaling audio/video data, or other suitable enhancement functions. Generally, the enhancement functions can produce audio and/or video data that includes enhanced versions of original audio and/or video data. In some implementations, the audiovisual enhancement functions can output a delta or mask that is recombined with the original input to produce an enhanced output.

Systems and methods according to example aspects of the present disclosure can provide for obtaining, by the receiver computing system, one or more receiver perception feedback signals associated with the audiovisual communication stream. In some implementations, the receiver perception feedback signal(s) can be any suitable signal indicative of understandability of the audiovisual stream at the receiver-side, such as signals relevant to the ability of the receiving user to interpret or comprehend the audiovisual communication stream. As an example, the receiver perception feedback signal(s) can be descriptive of perception of the audiovisual communication stream by a user operating the receiver computing system. For instance, the one or more receiver perception feedback signals can be obtained as output from one or more receiver perception feedback models. The one or more receiver perception feedback models can be run at the receiver computing system.

The receiver perception feedback model(s) can include, for example, a gaze detection model. The gaze detection model can be configured to recognize a region of video data upon which a user is focusing. For example, the gaze detection model can receive, with consent from the user, processed features descriptive of a user's line of sight (e.g., derived from facial video data). The gaze detection model may output an indication of a portion of audiovisual data upon which the user (e.g., of the receiver computing system) is focused.

Additionally and/or alternatively, the receiver perception feedback model(s) can include a user reaction recognition model. The user reaction recognition model can recognize a reaction of the user in response to audiovisual data of the user. For example, the user reaction recognition model can recognize an emotion or response of a user based on, for example, facial expression, voice expression, etc. Additionally and/or alternatively, the user reaction recognition model can recognize a particular action of the user, such as holding an ear closer to a speaker or other type of action.

Additionally and/or alternatively, the receiver perception feedback model(s) can include a user pose determination model. For instance, the pose determination model can determine how far the user is from the display and/or audio output equipment. Such a model may additionally or alternatively, determine any other user poses which may affect the ability of the user to comprehend the audiovisual communication stream.

Additionally and/or alternatively, the receiver perception feedback model(s) can include an ambient noise level recognition model. The ambient noise level recognition model can receive audio data in an environment of the user (e.g., from the user's audiovisual stream) and can process the audio data to detect a level of ambient noise in the environment.

Additionally and/or alternatively, the receiver perception feedback model(s) can include an automatic speech recognition model. The automatic speech recognition model can recognize spoken words in audio data received from the sender. For instance, the automatic speech recognition model output (e.g., a confidence score) can be indicative of a clarity or understandability of the audio data received at the receiver computing system. As one example, the automatic speech recognition model output may output a word or phrase indicating confusion by the receiver, such as "can you repeat that?" or "huh?" or "excuse me?" or similar. The presence of these confusion-indicative phrases can serve to indicate low understandability of the audio data.

In some implementations, the receiver perception feedback model(s) can include an environmental classification model configured to determine an environment of the receiving user, such as by detecting certain categories of sounds in the environment of the receiving user. As one example, categories of sounds associated with traffic, vehicles, etc., can serve to indicate that the user is a passenger of an automobile (e.g., driving).

The receiver can additionally run other models such as, for example, decompression models, such as inverse decompression models of compression models run at the sender computing system, upsampling models (e.g., superresolution models), or other suitable models. For instance, the receiver can run models to prepare the audiovisual stream for being provided to the user, such as improving quality, applying visual effects, or other functionality.

Systems and methods according to example aspects of the present disclosure can provide for transmitting, by the receiver computing system, the one or more receiver perception feedback signals to the sender computing system. For instance, in some implementations, the receiver perception feedback signals can be transmitted over a same network as the audiovisual communication stream. The network may be a peer to peer network, a network routed through one or more servers, etc. In cases where the network includes one or more servers, the sender computing system can be the server itself (e.g., providing a high-fidelity version of the audiovisual stream, which may be provided differently to each of a plurality of receivers) or a transmitting computing system in communication with the server.

Systems and methods according to example aspects of the present disclosure can provide for applying, by the sender computing system, one or more audiovisual enhancement functions to the audiovisual communication stream based at least in part on the one or more receiver perception feedback signals. For instance, as the audiovisual stream progresses, the receiver perception feedback signals can be fed back to the sender to adjust the audiovisual enhancements to improve (e.g., optimize for) perceptual understanding of the receiver.

As one example, a receiver perception feedback signal can be gaze information from a gaze detection model. The gaze information can be fed to the sender to impact which areas (or regions) of video data are provided at higher fidelity and/or upsampled (e.g., compared to other regions or areas of video data in the audiovisual communication stream). For example, the sender computing system may apply a focus filter to provide an improved fidelity at a spatial region of a visual component of the transmitted audiovisual communication stream that is indicated by the receiver perception feedback signals to be the focus of the gaze of the receiving user. In some such examples, the sender computing system may additionally reduce the fidelity of a spatial region of the visual component of the transmitted audiovisual communication stream that is indicated by the receiver perception feedback signals not to be the focus of the gaze of the receiving user. In some examples, if the one or more receiver perception feedback signals indicate that the gaze of the receiving user is focused outside a display region on which a visual component of the audiovisual communication stream is presented, the sender computer system may decrease a fidelity of the visual component of the transmitted audiovisual communication stream. This may reduce bandwidth usage when it is determined that the user is not actually watching the video component. In addition or alternatively, the sending computing system may increase the fidelity of the audio component of the transmitted audiovisual communication stream. This may make up for the fact that the user is not seeing/looking at the visual cues, which can be helpful in properly comprehending the audio component. The gaze information can additionally and/or alternatively be used to focus on particular sounds, such as speech, by focusing on sounds associated with objects the user focuses on. For instance, the sender computing system may respond to the one or more receiver perception feedback signals indicating that the user's gaze is on a particular spatial region of a visual component of the transmitted audiovisual communication stream by increasing a fidelity of a part of the audio component of the stream that derives from an entity that is depicted in the particular spatial region of a visual component.

Additionally and/or alternatively, environmental classification signals can be fed back to the sender computing system to adjust for certain levels or classes of particularly interfering noise, such as loud speech. As an example, in response to the environmental classification signals indicating that the receiving user is driving, the sending computing system may increase the fidelity of the audio component of the stream and/or decrease the fidelity of the visual component of the stream.

Additionally and/or alternatively, user reaction recognition signals can be fed back to the sender to indicate if the receiver did not understand a portion of the audiovisual stream. For instance, if the receiver asks for clarification, the audio and/or video data may be upsampled or have improved fidelity. Similarly, if it is recognized that the user is squinting at the display, the video data of the stream may be upsampled or may be provided with improved fidelity. In some examples, this may be combined with gaze detection so that the fidelity of only those portions of the stream (audio and/or visual) that are the subject of the user's focus is increased.

Additionally or alternatively, the sender computing system may be configured to respond to one or more receiver perception feedback signals indicating a decrease in a confidence associated with recognition, using an automatic speech recognition model at the receiver computing system, of speech that is present in an audio component of the received audiovisual communication stream, by increasing the fidelity of the audio component of the transmitted audiovisual communication stream.

Additionally or alternatively, the sender computing system may be configured to respond to one or more receiver perception feedback signals indicating that the ambient noise level of an environment of the receiver computing system has increased by increasing a fidelity of an audio component of the transmitted audiovisual communication stream. In some such examples, the fidelity of a visual component of the transmitted audiovisual communication stream may be decreased to maintain a constant bandwidth usage.

Additionally or alternatively, the sender computing system may be configured to respond to one or more receiver perception feedback signals indicating that a change in the receiving user's pose may have adversely affected their ability to comprehend the stream by adapting the stream. For instance, if it is detected that the user has moved further away from the audio output device, the fidelity of the audio component may be increased.

In some implementations, the one or more audiovisual enhancement functions can include a choice of compression scheme type. For example, a compression scheme used to compress the audiovisual stream at the sender side can be selected from a plurality of compression schemes, such as if a different compression scheme provides improved understandability. In some implementations, the one or more audiovisual enhancement functions can include a video fidelity adjustment. For example, a fidelity of at least a portion of video data included in the audiovisual stream can be adjusted (e.g., improved and/or reduced) based on the receiver perception feedback signals. Additionally and/or alternatively, in some implementations, the one or more audiovisual enhancement functions can include an audio fidelity adjustment. For example, a fidelity of at least a portion of audio data included in the audiovisual stream can be adjusted (e.g., improved and/or reduced) based on the receiver perception feedback signals. In some implementations, the one or more audiovisual enhancement functions can include a focus filter configured to provide an improved fidelity at a focus region including at least a portion of the audiovisual stream (e.g., audio and/or video data). For example, a fidelity of a portion of the audiovisual data indicated by the focus filter can be improved responsive to, for example, a user's gaze. As one example, video data in the region indicated by the focus filter can be provided at a higher resolution and/or fidelity. As another example, audio data can be altered by the focus filter, such as to provide source-speaker separation. In some implementations, the one or more audiovisual enhancement functions can include an ambient noise filter. For example, ambient noise filtering can be enabled, disabled, and/or adjusted.

One example implementation according to example aspects of the present disclosure, relating to adapting filtering and/or compression based on receiver-side gaze detection, is discussed below. A user is engaged in a video call and is receiving an audiovisual stream from a sender. Enhancement and/or compression functions are run on the sender side to transmit compressed or otherwise modified (e.g., optimized) audiovisual frames. These frames are received and/or decoded by a receiver and provided to the user. The receiver uses a gaze detection receiver feedback model to identify which portions of the audiovisual stream (e.g., video and/or audio portions) are most relevant to the user. For example, if the video stream depicts multiple people and the user is looking at a particular person, the portion of video data depicting that person (e.g., facial features of the person speaking) and/or audio data encoding that person's spoken audio may be more important to the user than portion(s) of video data depicting other people and/or portion(s) of audio data from other people. The gaze detection receiver feedback model can output a receiver perception feedback signal conveying the user's gaze, which is transmitted from the receiver back to the sender. The sender can then apply audiovisual enhancements, such as a focus filter, to improve quality on the relevant portions of the audiovisual stream and/or decrease quality (e.g., filter out audio from less relevant sources) on the less relevant portions, such as to provide a constant bandwidth usage compared to the prior audiovisual enhancements, if any.

Another example implementation according to example aspects of the present disclosure, relating to adapting sender-side filtering based on a receiver's environment, is discussed below. For instance, a receiving user may be engaged in an audiovisual conversation from a noisy environment, such as a café. Over time during the audiovisual conversation, a level of ambient noise in the environment can vary, and at some points may become great enough that the user may have difficulty communicating with other participants in the conversation. For instance, the user may have difficulty speaking in or otherwise following the conversation, even with some noise cancelling, and/or may have difficulty understanding other speakers in the conversation. According to example aspects of the present disclosure, ambient noise information at the receiver side (e.g., from an ambient noise detection receiver perception feedback model) can be transmitted to the sender. The sender can then increase audio fidelity (e.g., at the expense of video fidelity and/or bandwidth, among other resources) such that the understandability of the conversation can be preserved. Similarly, if the ambient noise detection model detects that the ambient noise level has decreased, the audio fidelity may be decreased to preserve bandwidth without sacrificing understandability.

Another example implementation according to example aspects of the present disclosure, relating to informing sender-side processing based on receiver-side signals, is discussed below. This example further relates to providing for user-specific gestures and affect recognition (or emotion recognition) to be incorporated as receiver feedback. For instance, a first party and a second party may be engaged in a video call. A receiver computing system can be running receiver perception feedback models including a gaze recognition model and a user reaction recognition model. The first party may hold up an object, which is captured in the video data. The second party may attempt to focus on the object, but may have low understandability and/or be unable to perceive the object due to, for example, insufficient video fidelity. The receiver perception feedback models can provide receiver perception feedback signals indicative of the low understandability. For example, the gaze detection model may provide a feedback signal indicating that the user is focused on the object while the user reaction recognition model may provide an indication that the user is squinting, is unable to perceive the object, is confused, etc. In response to these feedback signals, the sender may responsively apply audiovisual enhancements to increase the video fidelity of the whole video data (e.g., frames) and/or a portion of the video data corresponding to the object. This example may be similarly applied to audio data. For instance, audio fidelity may be increased in response to audio-based user reaction recognition, such as clarification requests.

Example aspects of the present disclosure may be discussed herein with respect to two parties (e.g., a sender and a receiver) for the purposes of illustration. Example aspects of the present disclosure can find applications in systems having any number of parties, such as three or more parties. Additionally and/or alternatively, some or all parties can act as both sender and receiver to provide and receive audiovisual data (e.g., simultaneously). Multiple parties can be implemented in any suitable manner. In some implementations, the one or more audiovisual enhancement functions can be respective to the receiver computing system. As one example, such as if the audiovisual communications are provided through a server, the sender may, in some implementations, desirably send one instance of each frame of an audiovisual communication stream. As such, in some implementations, the systems and methods described herein may jointly optimize for each receiver and/or party. For instance, the audiovisual enhancement functions may be applied based on receiver feedback signals from some or all receivers. Additionally and/or alternatively, in some implementations, the audiovisual enhancement functions may be applied based on a receiver that has the most constraints (e.g., the lowest available resources). As another example, in the case where gaze detection is used, if different parties are focusing on different portions of the audiovisual stream, it may be desirable to optimize for a difference between the parties. In some cases, such as on a peer to peer connection, this can be done independently.

In some implementations, the audiovisual communication stream can be routed through a central server prior to being sent to one or more receivers. In some implementations, the central server can apply the audiovisual enhancement functions. Different receivers can receive different sets of audiovisual enhancement functions that are based on the needs of the receivers. For instance, the central server can act as the sender. This can be beneficial in some implementations, such as when a sender broadcasts through a central server to multiple receivers, such as many receivers, such as in the case of an audiovisual streaming or broadcasting service, a teleconference with several participants, etc. In some implementations, the originator of the audiovisual stream may provide to a central server a high fidelity stream, which may be subsequently provided to one or more receivers (e.g., at reduced fidelity tailored for each receiver according to example aspects of the present disclosure).

In some implementations, a receiver can receive audiovisual communication streams from multiple senders. For instance, a receiver may be a participant in a multiparty conference in which a plurality of participants have established audiovisual communication streams with the receiver. For example, an example method for applying audiovisual enhancement functions to a multiparty communication can include receiving, by a receiver computing system, at least one audiovisual communication stream including a plurality of audiovisual communication channels from a plurality of sender computing systems. For instance, each audiovisual communication channel can be respective to a sender computing system of the plurality of sender computing systems. The audiovisual communication channel(s) can, in some implementations, be provided in a unique audiovisual communication stream (e.g., from a respective sending computing system). Additionally and/or alternatively, in some implementations, a plurality of audiovisual communication channels can be combined into a single audiovisual communication stream (e.g., from a central server computing device in communication with a plurality of sender computing systems).

The method can include obtaining, by the receiver computing system, a plurality of receiver perception feedback signals respectively associated with each of the plurality of audiovisual communication channels. For instance, the one or more receiver perception feedback signals obtained as output from one or more receiver perception feedback models at the receiver computing system and descriptive of perception of a respective audiovisual communication channel by a user operating the receiver computing system. For example, the signals associated with a particular audiovisual communication channel can be indicative of perception characteristics (e.g., quality, regions of interest, etc.) of the particular channel. Furthermore, the method can include transmitting, by the receiver computing system, the plurality of receiver perception feedback signals to a respective sender computing system of the plurality of sender computing systems. In this way, a receiver computing system receiving a plurality of audiovisual signals from a plurality of audiovisual channels can provide for tailoring each received signal (e.g., each channel or stream) to the perception of the user of the receiver computing system. This can provide for efficient multi-party communications.

Some various example implementations of the present disclosure can include an end-to-end encoder-decoder architecture. For instance, a communication system can include one or more computing systems, such as a sender computing system and a receiver computing system. The communication system can, in particular, include a sender encoder model situated on a sender side (e.g., a sender computing system) and a receiver decoder model situated on the receiver side. The sender encoder model can be configured to encode the audiovisual stream prior to transmission to the receiver computing system. Additionally and/or alternatively, the receiver decoder model can be configured to decode the audiovisual stream from the sender computing system. A bottleneck can be positioned between the sender encoder model and the receiver decoder model. The bottleneck can include the audiovisual information transmitted at regular frequencies (e.g., the audiovisual stream). At the receiver side, the receiver perception feedback signals can be computed and fed back to the sender side to condition the sender encoder model. These signals may even be learned implicitly. In some implementations, the models can be trained in an end-to-end training manner, such as by optimizing a joint loss minimizing the resource cost (e.g., bandwidth cost) of the bottleneck. The cost can be based on an L2 norm or some other suitable measure of transmission resource cost. The loss can additionally take into account interpretability signals such as gaze recognition, user reaction recognition, clarification requests, etc.

Systems and methods can provide for a number of technical effects and benefits, including improvements to computing technology. One example technical effect relates to applying, by the sender computing system, one or more audiovisual enhancement functions to the audiovisual communication stream based at least in part on the one or more receiver perception feedback signals descriptive of a perception of the audiovisual communication stream by a receiver. By applying enhancement functions at the sender-side based on feedback signals associated with the receiver-side, the enhancement functions can be provided with improved responsiveness to receiver-side conditions, such as a user's use conditions, etc. Thus, systems and methods according to example aspects of the present disclosure can provide improved audiovisual communication quality, and especially understandability, such as in low resource and/or resource-constrained systems. Systems and methods according to example aspects of the present disclosure can further provide for reduced bandwidth usage and/or reduced power usage resulting from reduced resource requirements of the enhancement functions. This can further provide an improved audiovisual communication experience to a user by providing an improved understandability for given and/or reduced resources.

With reference now to the Figures, example embodiments of the present disclosure will be discussed in further detail.

FIG. 1A depicts a block diagram of an example computing system 100 that performs audiovisual communications according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. The machine-learned models 120 can be any suitable machine-learned model discussed herein, such as, for example, a sender encoder model, a receiver decoder model, an audiovisual enhancement function (e.g., an ambient noise filtering model, a compression model, etc.), a receiver perception feedback model (e.g., a user reaction recognition model, a gaze recognition model, etc.), and/or any other suitable model(s). Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an audiovisual communication service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected.

The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, input data in an autoencoder training scheme.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., audio data descriptive of speech or spoken words). The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
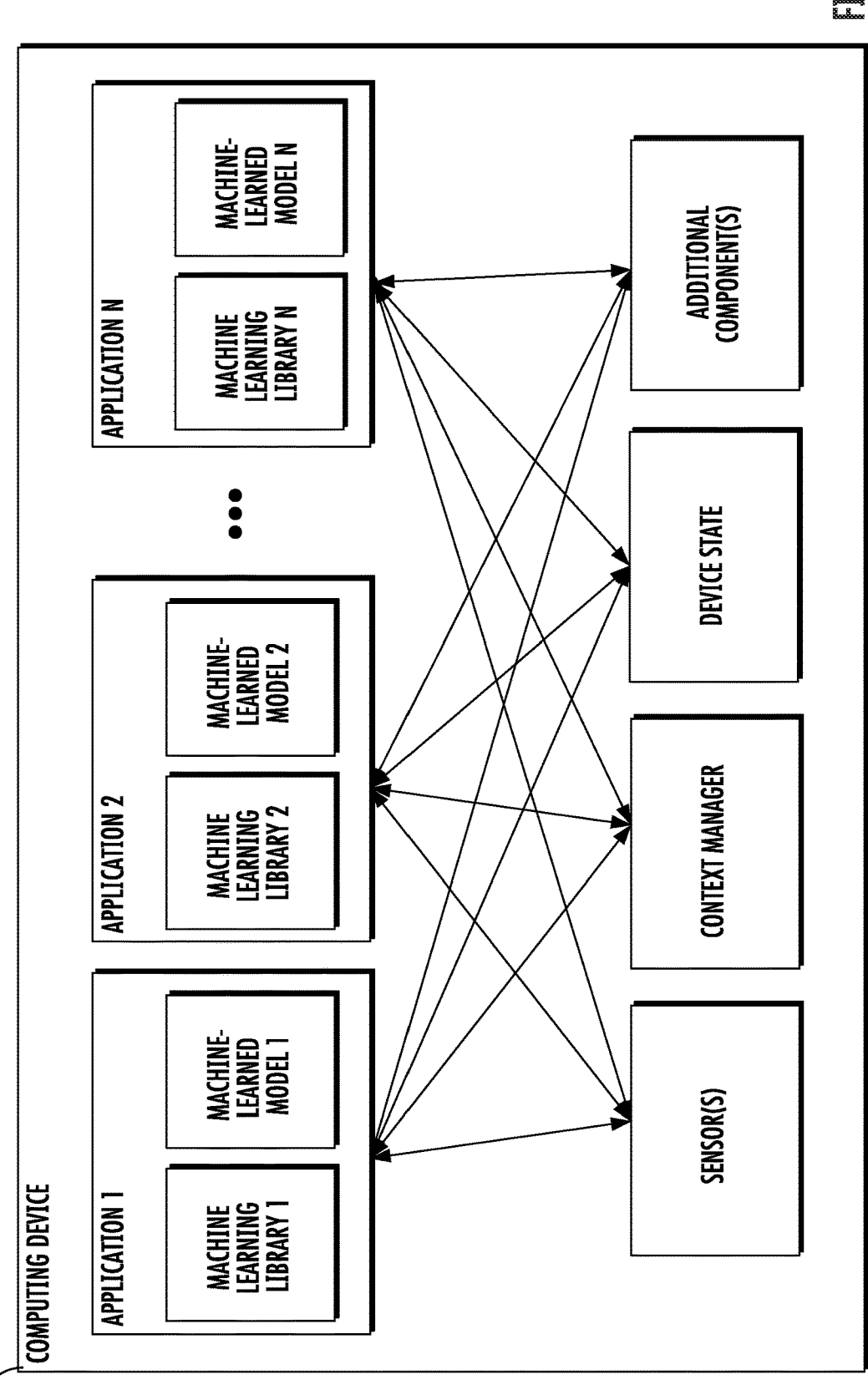
FIG. 1B depicts a block diagram of an example computing device that performs audiovisual communications according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
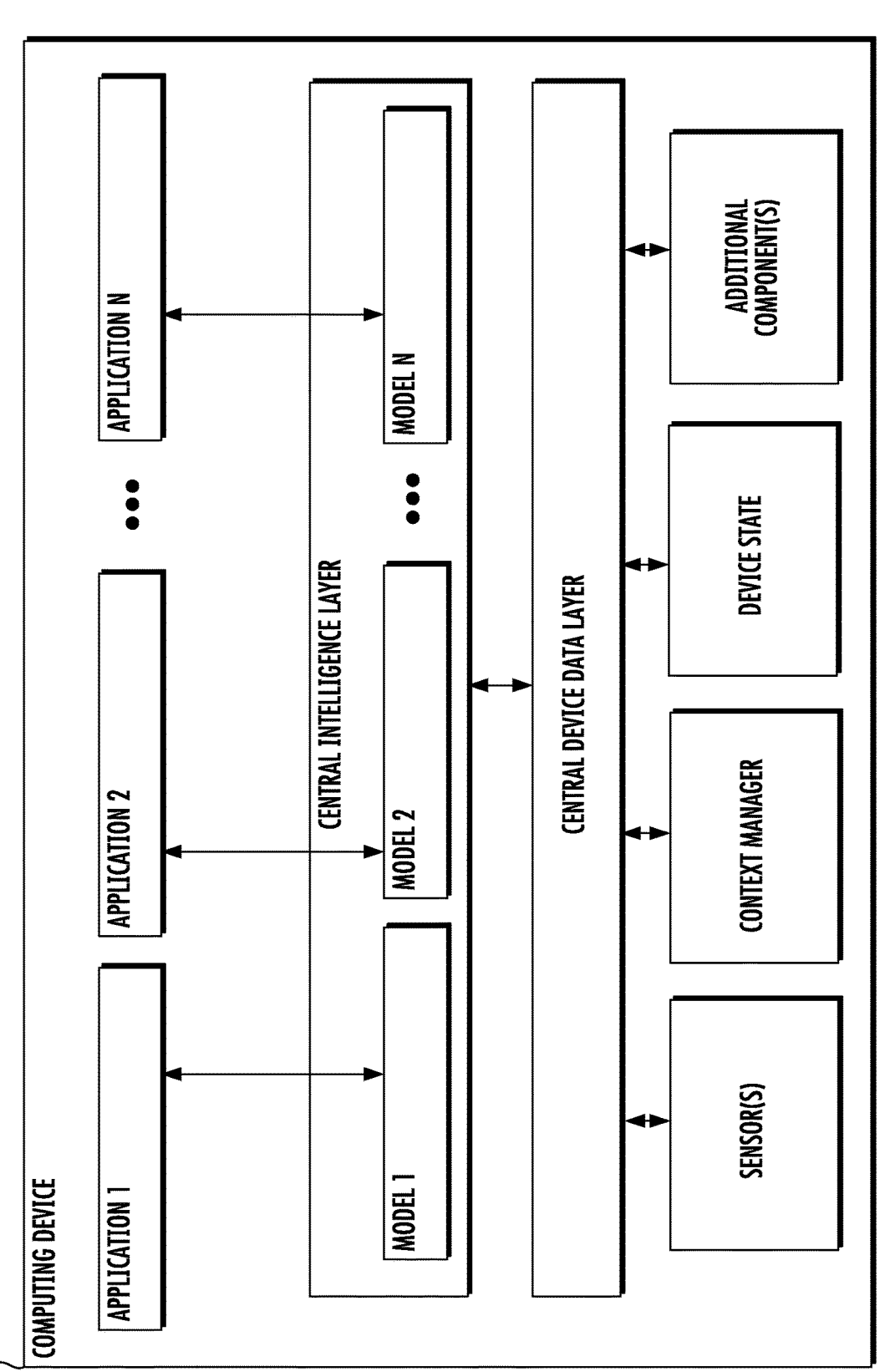
FIG. 1C depicts a block diagram of an example computing device that performs audiovisual communications according to example embodiments of the present disclosure.

FIG. 1C depicts a block diagram of an example computing device 50 that performs according to example embodiments of the present disclosure. The computing device can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figures 2, 3:
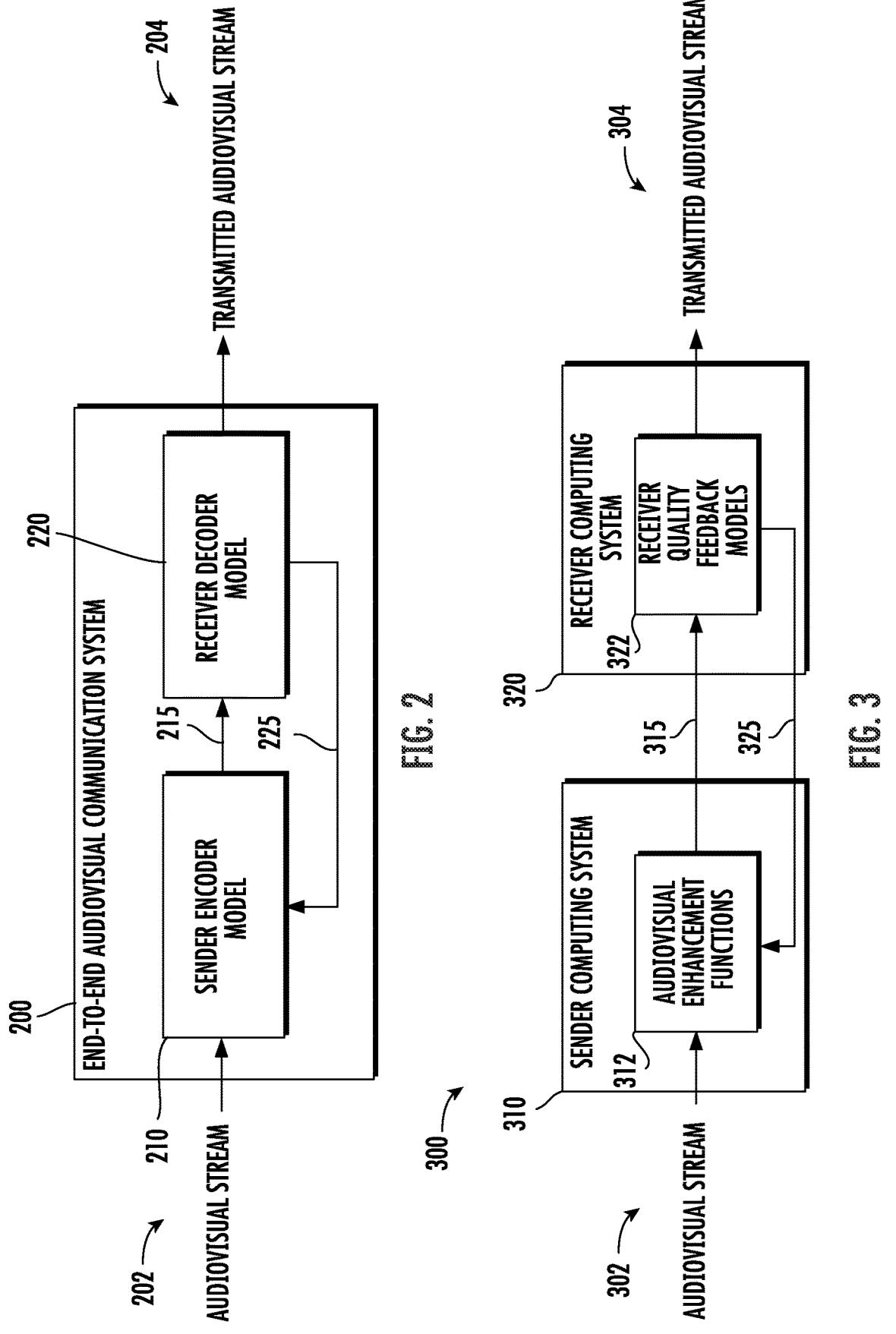
FIG. 2 depicts a block diagram of an example end-to-end audiovisual communication system according to example embodiments of the present disclosure.
FIG. 3 depicts a block diagram of an example audiovisual communication system according to example embodiments of the present disclosure.

FIG. 2 depicts a block diagram of an example end-to-end audiovisual communication system 200 according to example embodiments of the present disclosure. In some implementations, the system 200 is trained to receive a set of input data 202 descriptive of an audiovisual stream and, as a result of receipt of the input data 202, encode and transmit the input data 202 to eventually provide output data 204 that resembles the input data 202. The communication system 200 can, in particular, include a sender encoder model 210 situated on a sender side (e.g., a sender computing system) and a receiver decoder model 220 situated on the receiver side. The sender encoder model 210 can be configured to encode the audiovisual stream of input data 202 prior to transmission to a receiver computing system. Additionally and/or alternatively, the receiver decoder model 220 can be configured to decode the audiovisual stream from the sender computing system. A bottleneck 215 can be positioned between the sender encoder model 210 and the receiver decoder model 220. The bottleneck 215 can include the audiovisual information transmitted at regular frequencies (e.g., the audiovisual stream). At the receiver side, the receiver perception feedback signals 225 can be computed and fed back to the sender side to condition the sender encoder model. The receiver perception feedback signals 225 can be descriptive of perception of the output data 204 by a user viewing the output data 204. These signals 225 may even be learned implicitly. In some implementations, the models 210, 220 can be trained in an end-to-end training manner, such as by optimizing a joint loss minimizing the resource cost (e.g., bandwidth cost) of the bottleneck 215. The cost can be based on an L2 norm or some other suitable measure of transmission resource cost. The loss can additionally take into account interpretability signals such as gaze recognition, user reaction recognition, clarification requests, etc.

FIG. 3 depicts a block diagram of an example audiovisual communication system 300 according to example aspects of the present disclosure. The system 300 can include sender computing system 310 and receiver computing system 320. The sender computing system 310 can include one or more processors and one or more memory devices storing computer readable instructions that, when implemented, cause the one or more processors to perform operations. For instance, the operations can include transmitting an audiovisual communication stream 302 to receiver computing system 320. The sender computing system 310 can be configured to apply one or more audiovisual enhancement functions 312. The audiovisual enhancement functions can be any suitable audiovisual enhancement functions as described herein, such as a video fidelity adjustment, an audio fidelity adjustment, a focus filter configured to provide an improved fidelity at a focus region including at least a portion of the audiovisual stream, etc.

The receiver computing system 320 can include one or more processors and one or more memory devices storing computer readable instructions that, when implemented, cause the one or more processors to perform operations. For instance, the operations can include receiving, from the sender computing system 310, an audiovisual communication stream 315. The stream 315 can be modified from stream 302 by the enhancement functions 312 to, for instance, reduce bandwidth required to transmit stream 315 from sender computing system 310 to receiver computing system 320. The operations can include obtaining one or more receiver perception feedback signals 325 from the audiovisual communication stream 315. For instance, the one or more receiver perception feedback signals 325 can be obtained as output from one or more receiver perception feedback models 322. The operations can include transmitting the one or more receiver perception feedback signals 325 to the sender computing system 310. Additionally, the receiver computing system 320 can provide the transmitted audiovisual stream 304 to a user. For example, the receiver computing system 320 can decode the stream 315 into stream 304. Interpretability or understandability of the stream 304 can be predicted by the receiver perception feedback models 322. The receiver perception feedback models 322 can be any suitable receiver perception feedback models such as a user reaction recognition model, gaze detection model, etc. Generally, the receiver perception feedback signals 325 can be descriptive of perception of the audiovisual communication stream 304 by a user operating the receiver computing system 320.

The operations of the sender computing system 310 can further include receiving, from the receiver computing system 320, the one or more receiver perception feedback signals 325 indicative of an understandability of the audiovisual communication stream 304. The operations can further include applying the audiovisual enhancement functions 312 to the audiovisual communication stream 315 based at least in part on the one or more receiver perception feedback signals 325.

FIG. 4 depicts a flow chart diagram of an example method to perform selectively applying audiovisual enhancement functions to an audiovisual communications stream according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

The audiovisual enhancement functions can be selectively applied to improve understandability for participants of the audiovisual communications stream. The audiovisual communications stream can be unidirectional (e.g., having a sending computing system and a receiving computing system) and/or bidirectional (e.g., in which both computing systems can act as a sender and receiver, such as simultaneously).

The method 400 can include, at 402, transmitting, by a sender computing system, an audiovisual communication stream to a receiver computing system. The audiovisual communication stream can be any suitable representation of audiovisual communications. For instance, the audiovisual communication stream may be a real-time stream, such as a stream including a plurality of frames, packets, etc. Additionally and/or alternatively, the audiovisual communication stream may be pre-recorded, such as a pre-recorded video provided from a video streaming service. The audiovisual communication stream may be continuous and/or synchronous (e.g., provided in real time or near-real time). Example aspects of the present disclosure are generally discussed with reference to a multi-party, bidirectional audiovisual communication, such as a teleconference, video call, etc. It should be understood that example aspects of the present disclosure can be applied to any suitable audiovisual stream, including unidirectional communications, media streaming services, user-generated content streaming services, broadcasting services, surveillance systems, (e.g., audiovisual) sensors performing data upload, or other suitable streams.

For instance, an audio-based and/or video-based conference, call, or other form of audiovisual communication (e.g., the audiovisual stream) can be established between two or more parties, including a sender computing system and a receiver computing system. The audiovisual stream can be established by any suitable communication protocol, such as TCP or UDP. The audiovisual stream may also be established by any suitable communication or other streaming application.

The sender computing system can, in some implementations, initially run one or more audiovisual enhancement functions, such as compression models or algorithms. The compression models or algorithms can be any suitable compression models/algorithms, such as neural network based compression models (e.g., GAN-based models), heuristics based compression models/algorithms, or any other suitable compression models/algorithms. Generally, these compression models/algorithms can receive an audio and/or video frame or sequence of frames as inputs and output an enhanced version, such as a compressed version having reduced fidelity and/or reduced storage resource requirements. The audiovisual communication stream can be compressed by any suitable compression algorithm at the sender computing system. The compression algorithm can be rules or heuristics based and/or neural network or other machine-learning based. Example compression algorithms can include MPEG, AAC, or Vorbis, among others. The compressed stream can be decompressed at the receiver side by a corresponding decompression algorithm.

Additionally, the audiovisual enhancement functions can include models or other functions for enhancements such as filtering ambient/background noise from audio data, filtering background objects from video data (e.g., blurring a background), upscaling audio/video data, or other suitable enhancement functions. Generally, the enhancement functions can produce audio and/or video data that includes enhanced versions of original audio and/or video data. In some implementations, the audiovisual enhancement functions can output a delta or mask that is recombined with the original input to produce an enhanced output.

The method 400 can include, at 404, obtaining, by the receiver computing system, one or more receiver perception feedback signals associated with the audiovisual communication stream. The receiver perception feedback signal(s) can be any suitable signal indicative of understandability of the audiovisual stream at the receiver-side. For instance, the one or more receiver perception feedback signals can be obtained as output from one or more receiver perception feedback models. The one or more receiver perception feedback models can be run at the receiver computing system. The receiver perception feedback signal(s) can be descriptive of perception of the audiovisual communication stream by a user operating the receiver computing system.

The receiver perception feedback model(s) can include, for example, a gaze detection model. The gaze detection model can be configured to recognize a region of video data upon which a user is focusing. For example, the gaze detection model can receive, with consent from the user, processed features descriptive of a user's line of sight (e.g., derived from facial video data). The gaze detection model may output an indication of a portion of audiovisual data upon which the user (e.g., of the receiver computing system) is focused.

Additionally and/or alternatively, the receiver perception feedback model(s) can include a user reaction recognition model. The user reaction recognition model can recognize a reaction of the user in response to audiovisual data of the user. For example, the user reaction recognition model can recognize an emotion or response of a user based on, for example, facial expression, voice expression, etc. Additionally and/or alternatively, the user reaction recognition model can recognize a pose of the user, such as holding an ear closer to a speaker or other type of pose.

Additionally and/or alternatively, the receiver perception feedback model(s) can include an ambient noise level recognition model. The ambient noise level recognition model can receive audio data in an environment of the user (e.g., from the user's audiovisual stream) and can process the audio data to detect a level of ambient noise in the environment. Additionally and/or alternatively, the receiver perception feedback model(s) can include an automatic speech recognition model. The automatic speech recognition model can recognize spoken words in audio data received from the sender. For instance, the automatic speech recognition model output (e.g., a confidence score) can be indicative of a clarity or understandability of the audio data received at the receiver computing system. Furthermore, in some implementations, the receiver perception feedback model(s) can include an environmental classification model to detect certain categories of sounds in an environment of the user.

The receiver can additionally run other models such as, for example, decompression models, such as inverse decompression models of compression models run at the sender computing system, upsampling models (e.g., superresolution models), or other suitable models. For instance, the receiver can run models to prepare the audiovisual stream for being provided to a user, such as improving quality, applying visual effects, or other functionality.

The method 400 can include, at 406, transmitting, by the receiver computing system, the one or more receiver perception feedback signals to the sender computing system. For instance, in some implementations, the receiver perception feedback signals can be transmitted over a same network as the audiovisual communication stream. The network may be a peer to peer network, a network routed through one or more servers, etc.

The method 400 can include, at 408, applying, by the sender computing system, one or more audiovisual enhancement functions to the audiovisual communication stream based at least in part on the one or more receiver perception feedback signals. For instance, as the audiovisual stream progresses, the receiver perception feedback signals can be fed back to the sender to adjust the audiovisual enhancements to improve (e.g., optimize for) perceptual understanding of the receiver. As one example, a receiver perception feedback signal can be gaze information from a gaze detection model. The gaze information can be fed to the sender to impact which areas of video data are provided at higher fidelity and/or upsampled. The gaze information can additionally and/or alternatively be used to focus on particular sounds, such as speech, by focusing on sounds associated with objects the user focuses on. Additionally and/or alternatively, environmental classification signals can be fed back to the sender computing system to adjust for certain levels or classes of particularly interfering noise, such as loud speech. Additionally and/or alternatively, user reaction recognition signals can be fed back to the sender to indicate if the receiver did not understand a portion of the audiovisual stream. For instance, if the receiver asks for clarification, the audio and/or video data may be upsampled or have improved fidelity.

In some implementations, the one or more audiovisual enhancement functions can include a choice of compression scheme type. For example, a compression scheme used to compress the audiovisual stream at the sender side can be selected from a plurality of compression schemes, such as if a different compression scheme provides improved understandability. In some implementations, the one or more audiovisual enhancement functions can include a video fidelity adjustment. For example, a fidelity of at least a portion of video data included in the audiovisual stream can be adjusted (e.g., improved and/or reduced) based on the receiver perception feedback signals. Additionally and/or alternatively, in some implementations, the one or more audiovisual enhancement functions can include an audio fidelity adjustment. For example, a fidelity of at least a portion of audio data included in the audiovisual stream can be adjusted (e.g., improved and/or reduced) based on the receiver perception feedback signals. In some implementations, the one or more audiovisual enhancement functions can include a focus filter configured to provide an improved fidelity at a focus region. For example, a fidelity of a portion of the audiovisual data indicated by the focus filter can be improved responsive to, for example, a user's gaze. In some implementations, the one or more audiovisual enhancement functions can include an ambient noise filter. For example, ambient noise filtering can be enabled, disabled, and/or adjusted.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for selectively applying audiovisual enhancement functions to an audiovisual communications stream, the method comprising:

transmitting, by a sender computing system, an audiovisual communication stream to a receiver computing system;

obtaining, by the sender computing system, one or more receiver perception feedback signals associated with the audiovisual communication stream, the one or more receiver perception feedback signals obtained as output from one or more receiver perception feedback models at the receiver computing system and descriptive of perception of the audiovisual communication stream by a user operating the receiver computing system, wherein the one or more receiver perception feedback models comprise a gaze detection model; and applying, by the sender computing system, one or more audiovisual enhancement functions to the audiovisual communication stream based at least in part on the one or more receiver perception feedback signals, wherein the one or more audiovisual enhancement functions comprise an audio fidelity adjustment function, and wherein the method comprises:

responsive to the one or more receiver perception feedback signals indicating that the user's gaze is on a particular spatial region of a visual component of the transmitted audiovisual communication stream, applying, by the sender computing system, an audio fidelity adjustment to a part of an audio component of the audiovisual communication stream corresponding to the particular spatial region.

2. The computer-implemented method of claim 1, wherein the one or more receiver perception feedback models comprise an ambient noise level recognition model, and wherein the method comprises:

responsive to the one or more receiver perception feedback signals indicating that the ambient noise level of an environment of the receiver computing system has increased, applying, by the sender computing system, the one or more audiovisual enhancement functions to increase a fidelity of an audio component of the transmitted audiovisual communication stream.

3. The computer-implemented method of claim 1, wherein the one or more audiovisual enhancement functions comprise a focus filter configured to provide an improved fidelity at a focus region, and wherein the method comprises:

applying, by the sender computing system, the focus filter to the audiovisual stream to provide an improved fidelity at spatial region of a visual component of the transmitted audiovisual communication stream that is indicated by the receiver perception feedback signals to be a focus of the gaze of the user operating the receiver computing system.

4. The computer-implemented method of claim 1 wherein the one or more receiver perception feedback models comprise a user reaction recognition model and the one or more audiovisual enhancement functions comprise a video fidelity adjustment and/or an audio fidelity adjustment, and wherein the method comprises:

responsive to the one or more receiver perception feedback signals indicating that the user may be having difficulty comprehending the transmitted audiovisual communication stream, applying, by the sender computer system, the one or more audiovisual enhancement functions to increase a fidelity of an audio component of the transmitted audiovisual communication stream and/or increase a fidelity of at least part of a visual component of the transmitted audiovisual communication stream.

5. The computer-implemented method of claim 4, wherein the method comprises:

responsive to the one or more receiver perception feedback signals indicating that the user may be having difficulty comprehending the visual component of the transmitted audiovisual communication stream, applying by the sender computer system the one or more audiovisual enhancement functions to increase a fidelity of a region of a visual component of the transmitted audiovisual communication stream that is indicated to be a focus of the gaze of the user operating the receiver computing system.

6. The computer-implemented method of claim 1, wherein the method comprises:

responsive to the one or more receiver perception feedback signals indicating that the user's gaze is on the particular spatial region of the visual component of the transmitted audiovisual communication stream, applying by the sender computer system the one or more audiovisual enhancement functions to increase a fidelity of a part of the audio component of the transmitted audiovisual communication stream that derives from an entity that is depicted in the particular spatial region of the visual component of the transmitted audiovisual communication stream.

7. The computer-implemented method of claim 1, wherein the one or more receiver perception feedback models comprise an automatic speech recognition model and the one or more audiovisual enhancement functions comprise an audio fidelity adjustment, and wherein the method comprises:

responsive to the one or more receiver perception feedback signals indicating a decrease in a confidence associated with recognition, using the automatic speech recognition model, of speech that is present in an audio component of the audiovisual communication stream received at the receiver computing system, applying, by the sender computer system, the one or more audiovisual enhancement functions to increase a fidelity of the audio component of the transmitted audiovisual communication stream.

8. The computer-implemented method of claim 1, the one or more audiovisual enhancement functions comprise a video fidelity adjustment and/or an audio fidelity adjustment, and wherein the method comprises:

responsive to the one or more receiver perception feedback signals indicating that the gaze of the user operating the receiver computing system is focused outside a display region on which the visual component of the audiovisual communication stream is presented, applying, by the sender computer system, the one or more audiovisual enhancement functions to decrease a fidelity of the visual component of the transmitted audiovisual communication stream and/or to increase a fidelity of an audio component of the transmitted audiovisual communication stream.

9. The computer-implemented method of claim 1, wherein the one or more receiver perception feedback signals are continuously received from the receiver computing system to provide real-time feedback.

10. The computer-implemented method of claim 1, wherein the one or more audiovisual enhancement functions comprise one or more of:
    a choice of compression scheme type;
    a video fidelity adjustment;
    an audio fidelity adjustment;
    a focus filter configured to provide an improved fidelity at a focus region; and
    one or more audiovisual enhancement functions comprise an ambient noise filter.

11. The computer-implemented method of claim 1, wherein the one or more receiver perception feedback models comprise one or more of:
    an ambient noise level recognition model;
    a user reaction recognition model; and
    an automatic speech recognition model.

12. A computing system configured for selectively applying audiovisual enhancement functions to an audiovisual communications stream, the computing system comprising:
    a sender computing system comprising one or more processors and one or more memory devices storing computer readable instructions that, when implemented, cause the one or more processors to perform operations, the operations comprising:
        transmitting an audiovisual communication stream to a receiver computing system;
        receiving, from the receiver computing system, one or more receiver perception feedback signals;
        applying one or more audiovisual enhancement functions to the audiovisual communication stream based at least in part on the one or more receiver perception feedback signals, wherein the one or more receiver perception feedback signals are generated by a gaze detection model and the one or more audiovisual enhancement functions comprise a video fidelity adjustment and/or an audio fidelity adjustment; and
    responsive to the one or more receiver perception feedback signals indicating that the gaze of a user operating the receiver computing system is focused outside a display region on which a visual component of the audiovisual communication stream is presented, applying, by the sender computer system, the one or more audiovisual enhancement functions to decrease a fidelity of the visual component of the audiovisual communication stream and/or to increase a fidelity of an audio component of the audiovisual communication stream.

13. The computing system of claim 12, wherein the one or more receiver perception feedback signals are continuously received from the receiver computing system to provide real-time feedback.

14. The computing system of claim 12, wherein the sender computing system comprises a sender encoder model, the sender encoder model configured to encode the audiovisual stream prior to transmission to the receiver computing system.

15. The computing system of claim 12, wherein the one or more audiovisual enhancement functions comprise one or more of:
    a choice of compression scheme type;
    a focus filter configured to provide an improved fidelity at a focus region; and
    one or more audiovisual enhancement functions comprise an ambient noise filter.

16. The computing system of claim 12, wherein the one or more receiver perception feedback signals are generated by one or more of:
    an ambient noise level recognition model;
    a user reaction recognition model; and
    an automatic speech recognition model.

17. A computing system configured for selectively applying audiovisual enhancement functions to an audiovisual communications stream, the computing system comprising:
    a receiver computing system comprising one or more processors and one or more memory devices storing computer readable instructions that, when implemented, cause the one or more processors to perform operations, the operations comprising
        receiving, from a sender computing system, an audiovisual communication stream;
        obtaining one or more receiver perception feedback signals associated with the audiovisual communication stream, the one or more receiver perception feedback signals obtained as output from one or more receiver perception feedback models comprising a gaze detection model; and
        transmitting the one or more receiver perception feedback signals to the sender computing system, the one or more receiver perception feedback signals indicating that a gaze of a user is on a particular spatial region of a visual component of the audiovisual communication stream; and
        receiving, from the sender computing system, a modified audiovisual communication stream, the modified audiovisual communication stream including an audio fidelity adjustment to a part of an audio component of the audiovisual communication stream corresponding to the particular spatial region.

18. The computing system of claim 17, wherein the receiver computing system comprises a receiver decoder model, the receiver decoder model configured to decode the audiovisual stream from the sender computing system.

19. The computing system of claim 17, wherein the one or more audiovisual enhancement functions comprise one or more of:
    a choice of compression scheme type;
    a video fidelity adjustment;
    an audio fidelity adjustment;
    a focus filter configured to provide an improved fidelity at a focus region; and
    one or more audiovisual enhancement functions comprise an ambient noise filter.

20. The computing system of claim 17, wherein the one or more receiver perception feedback models comprise one or any combination of:
    a gaze detection model;
    an ambient noise level recognition model;
    a user reaction recognition model; and
    an automatic speech recognition model.

21. A computer-implemented method for selectively applying audiovisual enhancement functions in a multiparty communication, the method comprising:

receiving, by a receiver computing system, at least one audiovisual communication stream comprising a plurality of audiovisual communication channels from a plurality of sender computing systems;

obtaining, by the receiver computing system, a plurality of receiver perception feedback signals respectively associated with each of the plurality of audiovisual communication channels, the one or more receiver perception feedback signals obtained as output from one or more receiver perception feedback models comprising a gaze detection model at the receiver computing system and descriptive of perception of a respective audiovisual communication channel by a user operating the receiver computing system; and transmitting, by the receiver computing system, the plurality of receiver perception feedback signals to a respective sender computing system of the plurality of sender computing systems, the one or more receiver perception feedback signals indicating that the gaze of the user operating the receiver computing system is focused outside a display region on which a visual component of the audiovisual communication stream is presented; and receiving, from the sender computing system, at least one modified audiovisual communication stream, the modified audiovisual communication stream including a decreased fidelity of the visual component of the audiovisual communication stream and/or an increased fidelity of an audio component of the audiovisual communication stream.

\* \* \* \* \*